United States Patent
LoCastro et al.

(10) Patent No.: US 10,767,767 B1
(45) Date of Patent: Sep. 8, 2020

(54) DRAIN PETCOCK

(71) Applicant: RB Distribution, Inc., Colmar, PA (US)

(72) Inventors: Michael Lawrence LoCastro, Pennsburg, PA (US); Charles Bowman, Easton, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 16/293,408

(22) Filed: Mar. 5, 2019

(51) Int. Cl.
| | | |
|---|---|---|
| *F16K 5/04* | (2006.01) | |
| *F16J 15/06* | (2006.01) | |
| *F01M 11/04* | (2006.01) | |
| *F16K 31/50* | (2006.01) | |

(52) U.S. Cl.
CPC ......... *F16K 5/045* (2013.01); *F01M 11/0458* (2013.01); *F16J 15/06* (2013.01); *F16K 31/50* (2013.01); *F01M 2011/0425* (2013.01)

(58) Field of Classification Search
CPC .......... F16K 5/045; F16K 31/44; F16K 31/50; F16J 15/06; F01M 11/04; F01M 11/0458; F01M 11/0408; F01M 2011/0425
USPC ................... 251/144, 284–288, 216; 184/1.5
See application file for complete search history.

(56) References Cited

U.S. PATENT DOCUMENTS

| | | | | |
|---|---|---|---|---|
| 65,018 A * | 5/1867 | Shaw | ................. | F16K 37/0058 137/559 |
| 1,548,091 A * | 8/1925 | Lombardi | ............... | F16K 24/04 251/216 |
| 2,151,656 A * | 3/1939 | Folke | ........................ | F16K 1/38 138/45 |
| 3,237,638 A * | 3/1966 | Rothenberg | ............ | F17C 13/06 137/319 |
| 4,101,000 A * | 7/1978 | Scully | ................ | F01M 11/0408 184/1.5 |
| 4,418,888 A * | 12/1983 | Jacobson | .................. | F16K 1/04 137/315.27 |
| 4,815,566 A * | 3/1989 | Caruso | ............... | F01M 11/0408 184/1.5 |
| 5,269,346 A * | 12/1993 | Yuda | ........................ | F16K 1/38 137/599.01 |
| 5,630,451 A * | 5/1997 | Bernard | ............. | F01M 11/0408 141/10 |
| 7,458,558 B1* | 12/2008 | Toth | ........................ | F16K 24/00 251/145 |

OTHER PUBLICATIONS

Jan. 2019—OEM Plug—Website: https://www.ebay.com/p/for-2015-2017-Ford-F150-Oil-Drain-Plug-Genuine-29265TR-2016-2-7I-V6/12024063277?iid=292739898500&chn=ps.
Jan. 2019—Second OEM Plug—Website: https://www.ebay.com/p/Ford-Kx6z6730b-Engine-Oil-Drain-Plug/1376453882?id=192573298872&chn=ps.
Jan. 2019—After Market Plug—Website: https://www.cjponyparts.com/upr-oil-pan-drain-plug-billet-f-150-ecoboost-2015-2019-f-150-raptor-2017-2018/p/HW4228/?gclid=EAlaIQobChMitKSnp5vf4AIVGuDICh0ilAM5EAQYASABEgK60_D_BwE.

* cited by examiner

*Primary Examiner* — John Bastianelli
(74) *Attorney, Agent, or Firm* — Volpe and Koenig, P.C.

(57) ABSTRACT

A drain petcock having a central channel for drainage, a side wall aperture for draining, and a closing plug that both closes the central channel and overlies the side wall aperture. The partial removal of the closing plug enables a controlled flow for initial draining. A full removal of the closing plug enables a more controlled flow through the central channel for further draining.

5 Claims, 7 Drawing Sheets

DRAIN PETCOCK

FIELD OF INVENTION

The invention is related generally to petcocks that are used in connection with fluid containing vessel that need occasional draining. More specifically, the invention relates to draining oil pans and the like associated with engines. Most specifically, the invention relates to oil pans and the like which have a draining hole facing a side rather than facing down.

BACKGROUND

Many of the Original Manufacturer Equipment (OEM) plugs, commonly known as billet plugs, which is solid and must be entirely removed from the pan in order to drain the pan. The OEM billet plug is connected to the pan with a camming action. This can be especially problematic for side draining pans as the fluid flow begins quickly and is difficult to control. There have been aftermarket attempts to improve the reliability and ease of removal in replacement for the OEM plug, but they have not addressed the problem of controlling the drainage.

SUMMARY

The present invention provides a drain plug that is a petcock with a central channel for drainage, a side wall aperture for draining, and a closing plug that both closes the central channel and overlies the side wall aperture. The partial removal of the closing plug enables a controlled flow for initial draining. The full removal of the closing plug enables a more controlled flow through the central channel for further draining.

DETAILED DESCRIPTION OF THE PREFERRED EMBODIMENT

Figure 1:
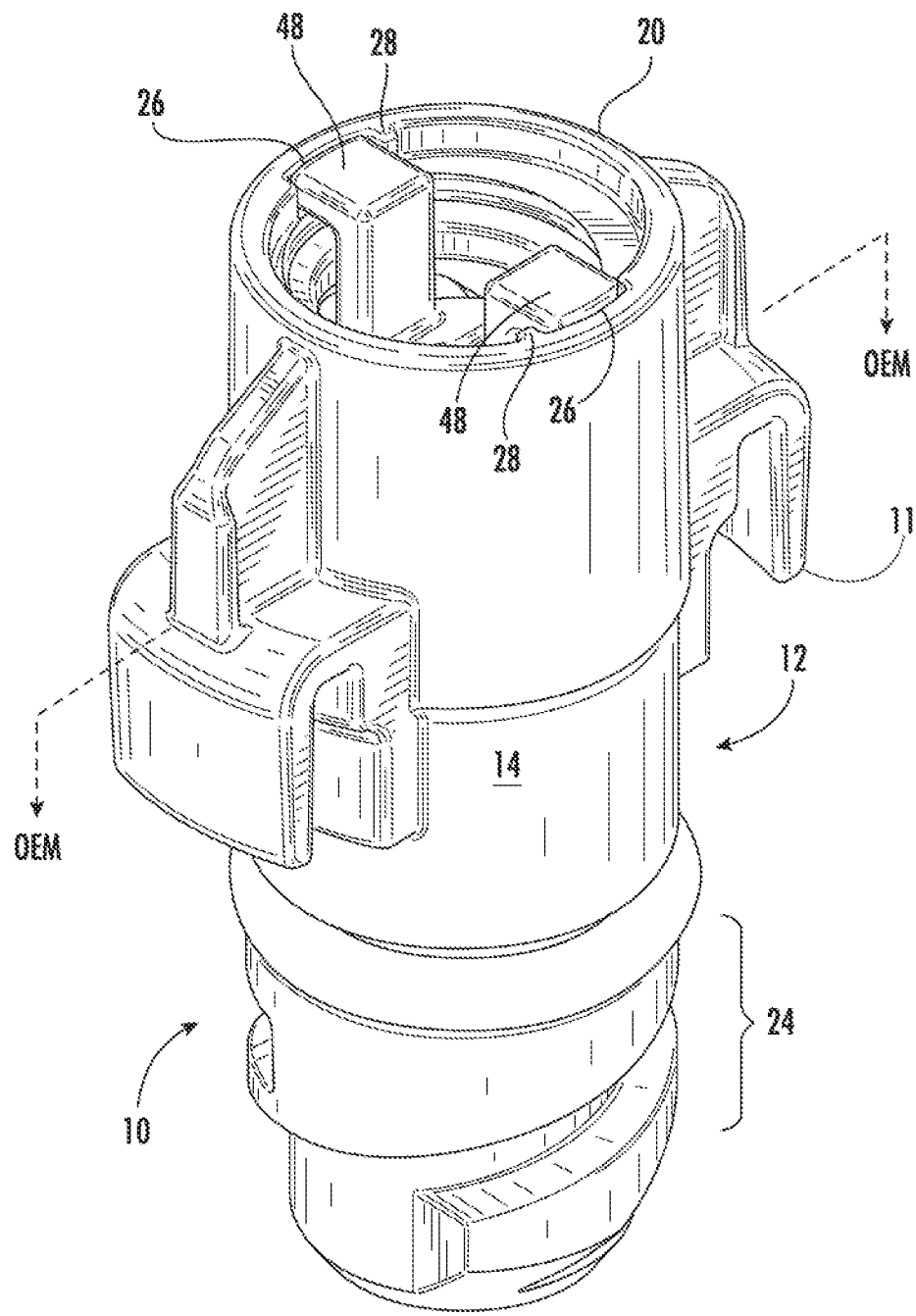
FIG. 1 illustrates a perspective view of a petcock with the closing plug in the fully closed position.
Figure 2:
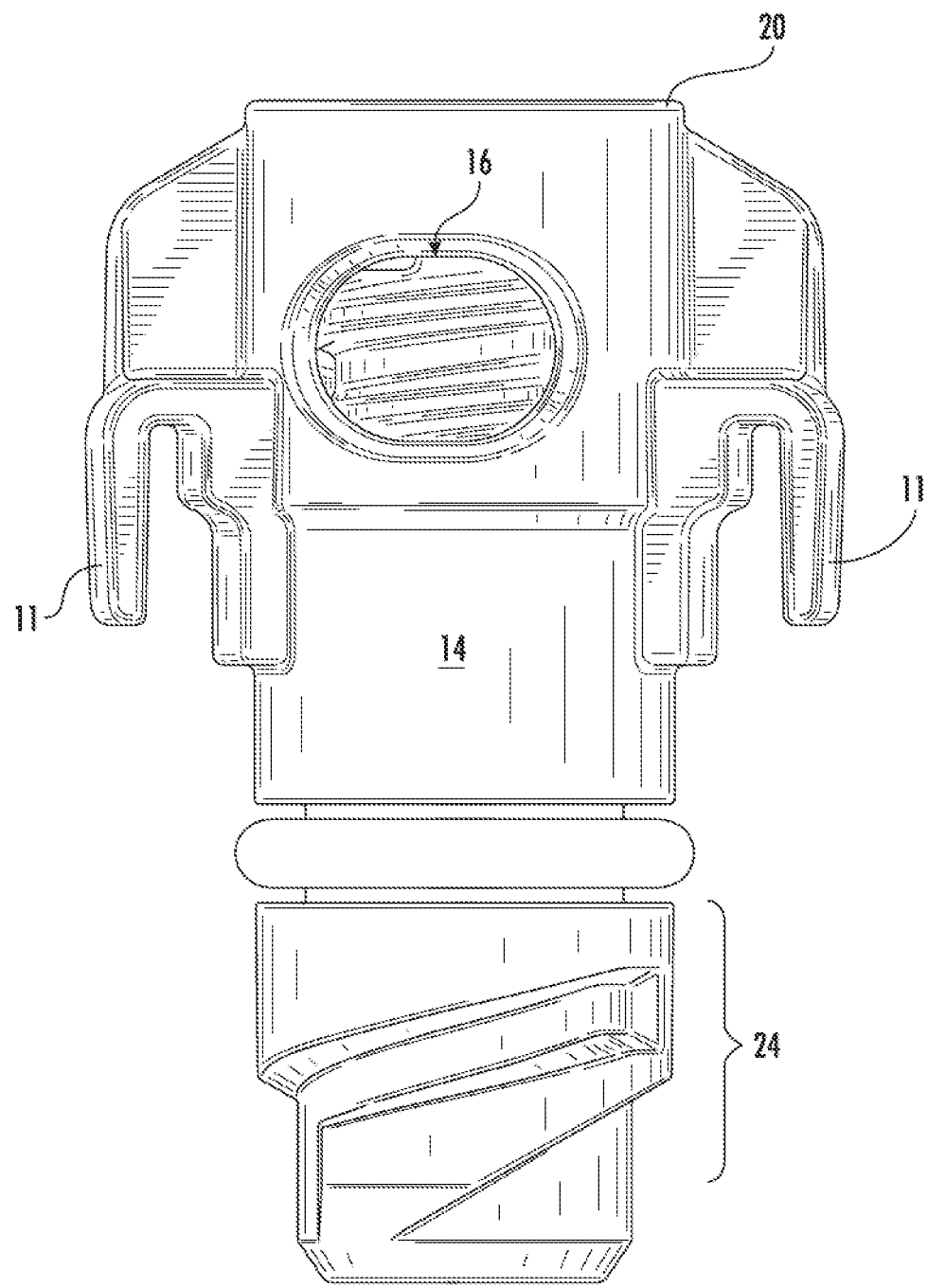
FIG. 2 is a plan view of the petcock of FIG. 1 that illustrates the side wall aperture.

Referring now to FIG. 1, the petcock 10 has an elongated body 12 with an outer configuration below the OEM line that mimics the geometry of the OEM part so that it will mate like the part it is replacing. The OEM configuration includes two dependent stoppers 11 that will limit the travel of the body 12 into the drain hole. The outer configuration above the OEM line provides additional body length to accommodate the additional features of the invention. The OEM part, unlike the present invention, is a solid body and there is no fluid passage.

One wall 14 of the body 12 has an aperture 16 that is located below the edge 20 which is the termination of the additional body portion 18. The aperture 16 is located in wall 14 so that it will provide a downward flow when the attachment end 24 is connected through the camming action to a drain hole. This orientation is especially helpful when the drain is provided in a side of the pan and a side discharge may soil other body parts or components.

Figure 3:
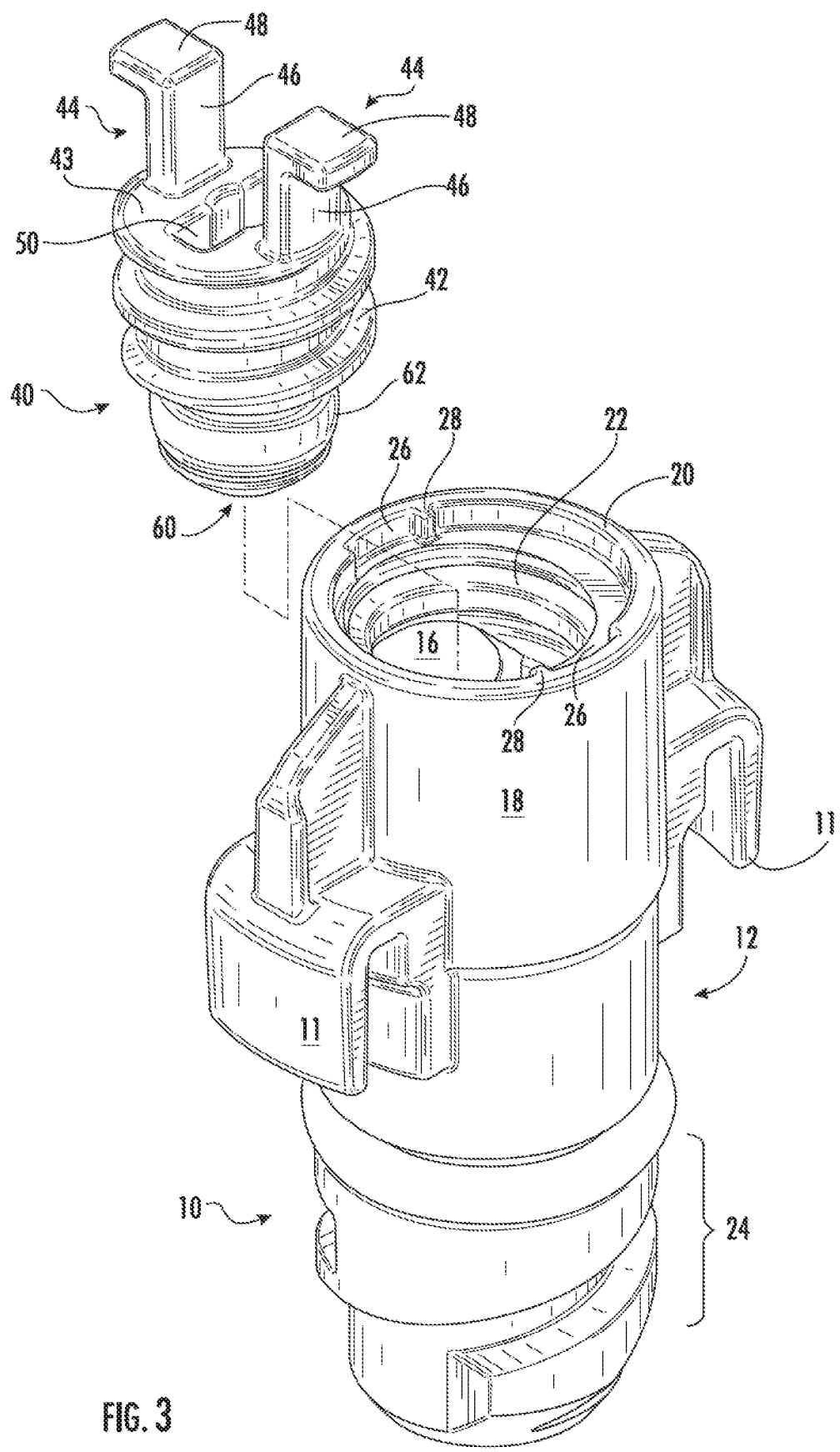
FIG. 3 illustrates the closing plug exploded away from the elongated body of the petcock.

With reference to FIG. 3, it can be seen that the additional portion 18 provides the length to form threads 22 on the interior wall of the petcock 10. The threads 22 extend below the aperture 16 so that fully inserted plug 40 overlies the aperture 16. This is not done for the purpose of sealing against fluid leaks but is done to limit debris from entering the central channel. Still with reference to FIG. 3, the closing plug 40 has external threads 42 that mate with the internal threads 22 to fasten the elongated body 12 and the plug 40 together. The threads 22 and 42 extend for a length that will bring the closing plug into a sealing position and when unthreaded will retain the closing plug in the additional portion 18 so that the central channel and the aperture are in fluid communication.

Still with reference to FIG. 3, the closing plug has an upper plane 43 with appendages 44 that include legs 46 that are vertical with respect to the plane 43 and projections 48 that are horizontal to the plane 43. When the closing plug 40 is in a fully closed condition the projections 48 are received within the recesses 26 and further rotation of the plug 40 is resisted by the stops 28.

Still with reference to FIG. 3, the plane 43 of plug 40 includes a recess 50 for using a tool, such as a flat or chisel tip screw driver, to aid in unthreading the plug 40. The appendage 44 may also be used for threading and unthreading the plug 40. When sufficient fluid has been released, the plug 40 can be fully removed so that any remaining fluid can flow through the channel in elongated body 12. Alternatively, the petcock 10 can be fully removed for the drain hole.

Figure 4:
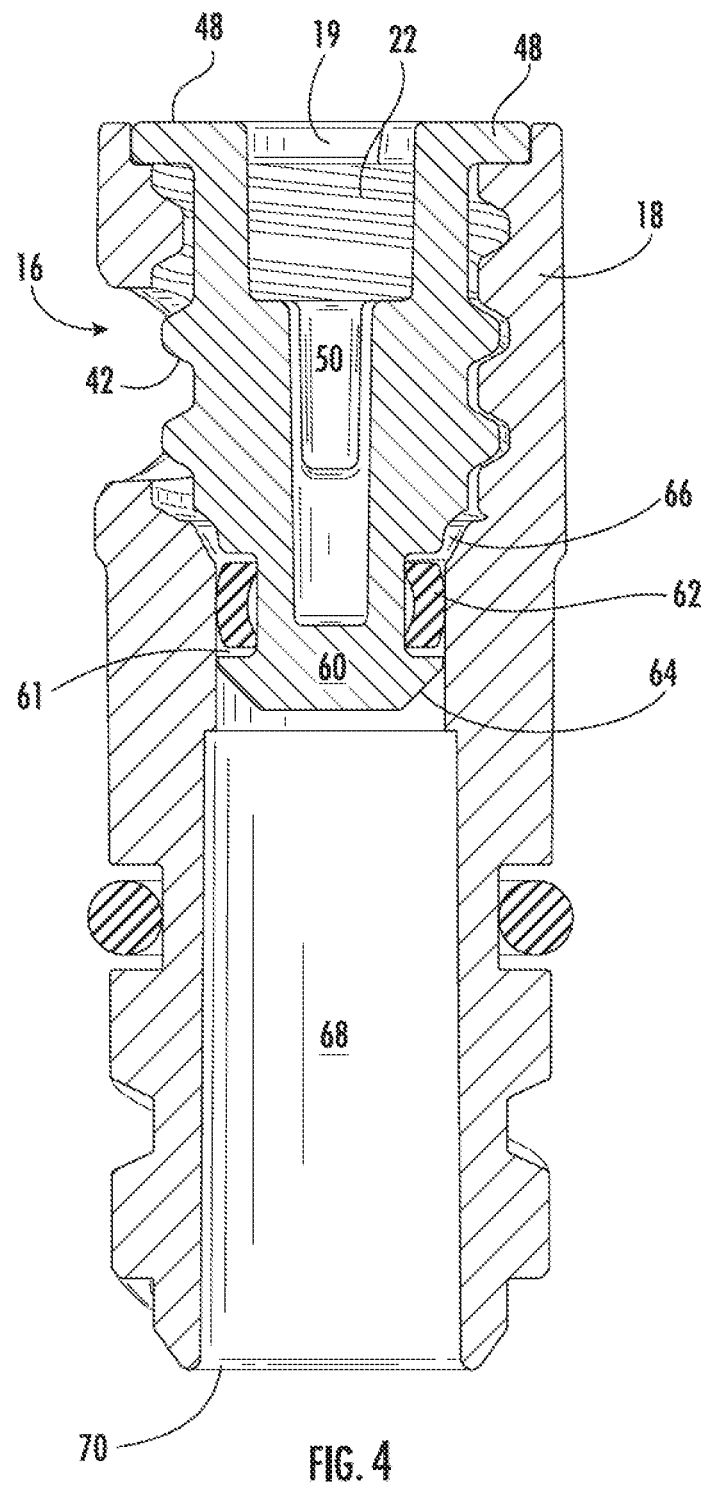
FIG. 4 is a sectional view of an assembled unit where the closing plug is closing the central channel and the side wall aperture.

With reference to FIG. 4, it can be seen that the interior wall 19 has threads that extend through the additional portion 18 and bring the tip 60 of closing plug 40 into the interior of the elongate body 10 so it is below the aperture 16. Likewise, the closing plug has a corresponding length. The tip 62 of plug 40 has a recess 61 that receives a sealing ring 62 that abuts interior wall 19. Below the sealing ring 62, the tip 60 has a conical surface 64. Just below the threads 22, a chamfer 66 is formed in the interior wall portion 19 to guide the sealing ring into abutment with the interior wall 19. The channel 68 is open to the edge 70.

Figure 5:
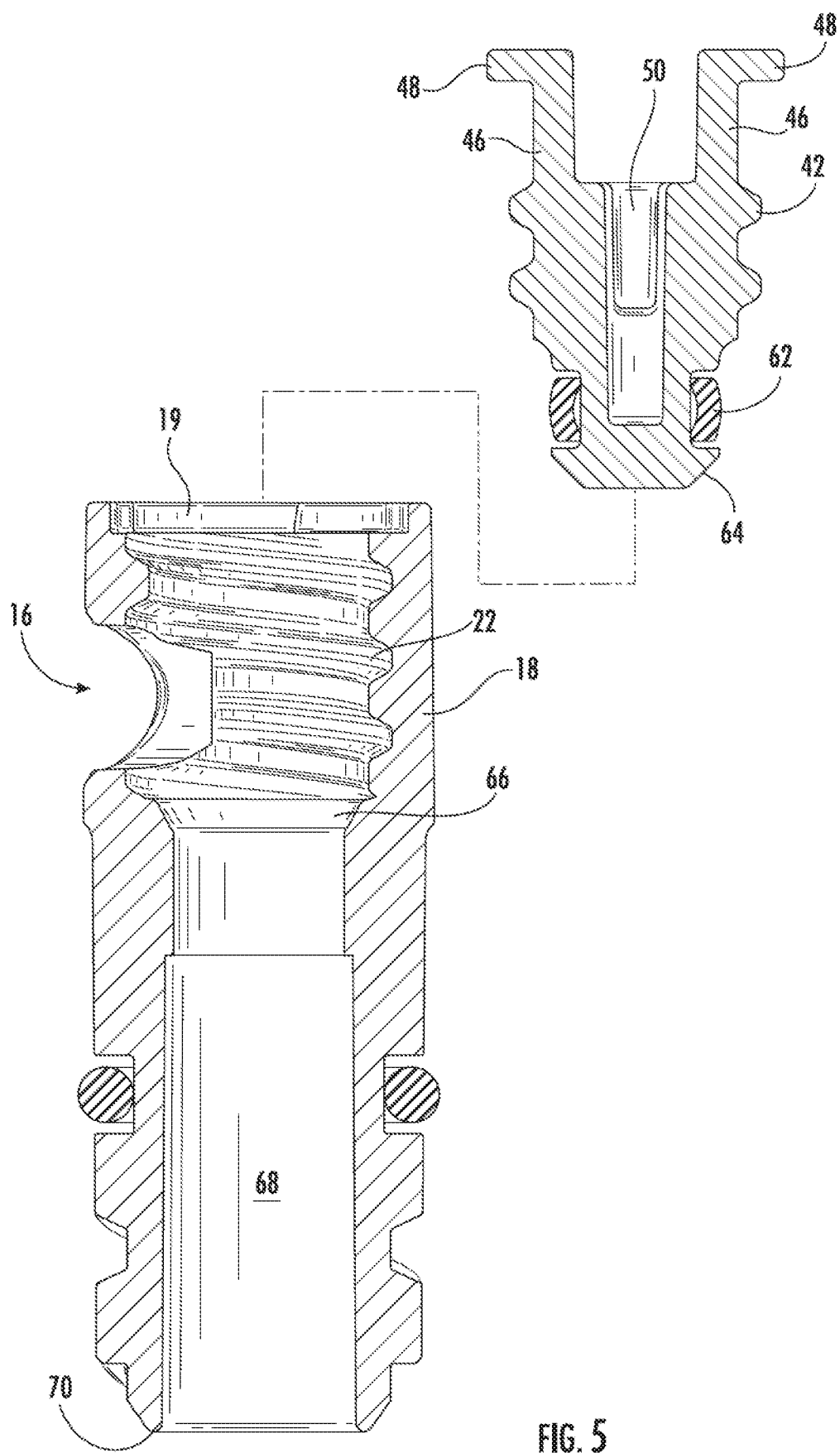
FIG. 5 is an exploded view of the section shown in FIG. 4.
Figure 6:
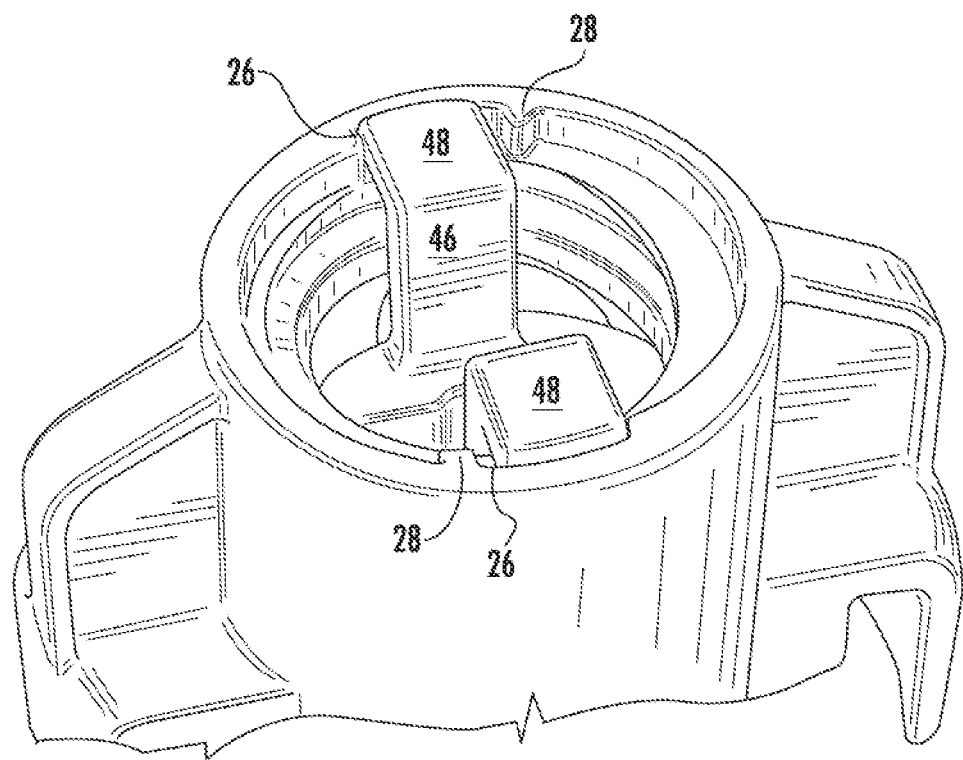
FIG. 6 is a fragmentary view of the top of the petcock with the closing plug in the fully closed position.
Figure 7:
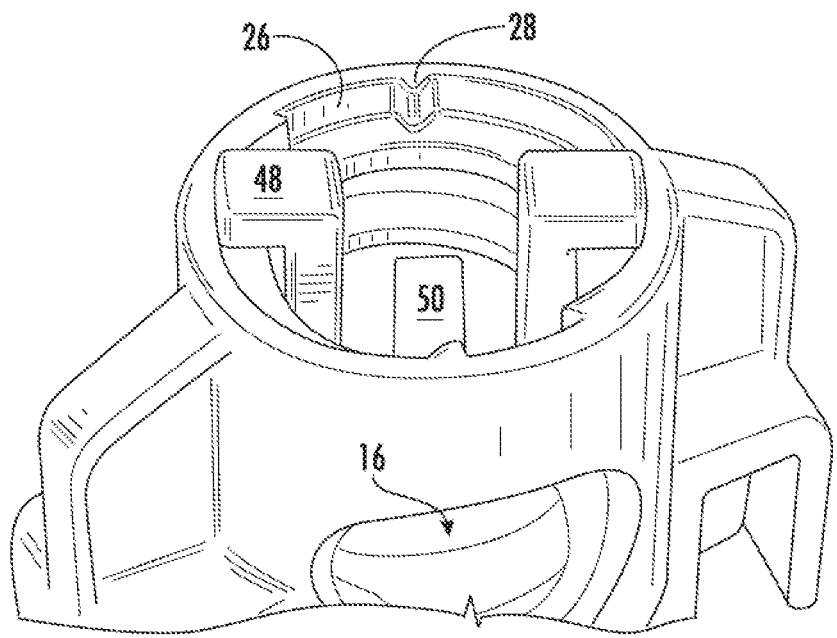
FIG. 7 is a fragmentary view with the closing plug in an early stage of being removed.
Figure 8:
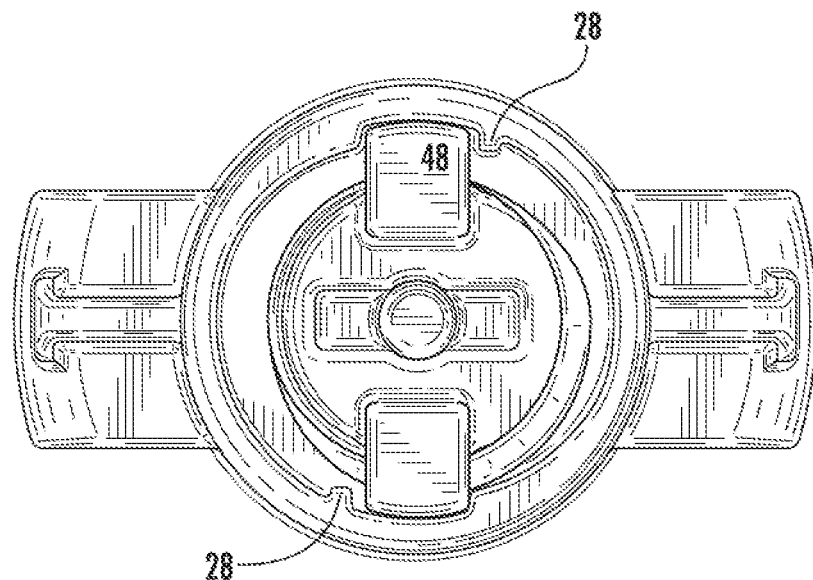
FIG. 8 illustrates a tool recess in the top of the closing plug.
Figure 9:
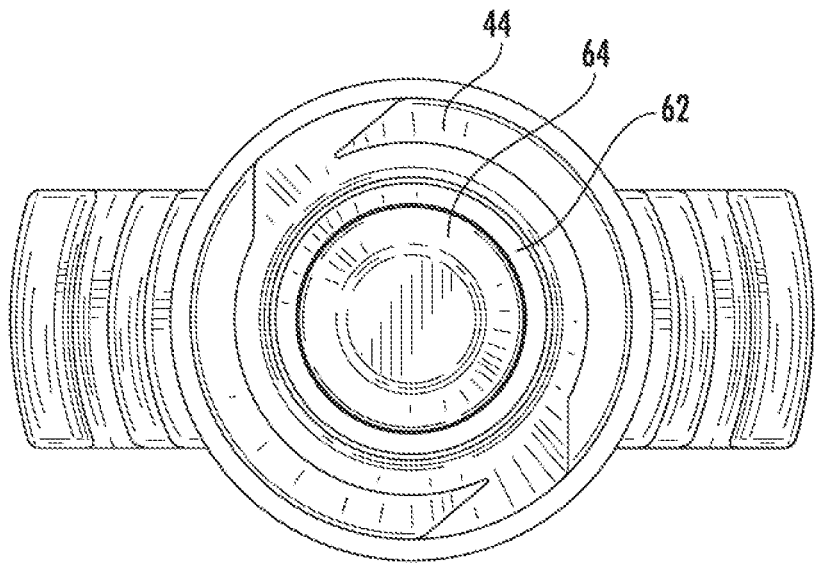
FIG. 9 illustrates the tip at the end of the closing plug.

With reference to FIGS. 6 and 7, these are enlarged views that show the projection 48 in the recesses 26 and against stops 28, FIG. 5, the projections 48 released from the recesses 26 for rotation, FIG. 7. With respect to FIG. 8, it is a top plan view of the condition illustrated in FIG. 6. With respect to FIG. 9, it is a plan view of the closing plug tip.

What is claimed is:

1. A drain petcock comprising:
   a body that has a central opening extending between a first open end portion that is configured to engage with an opening in a fluid container and a second open end portion that is spaced from the first open end portion;
   the second open end portion has an internal threading that extends from an outermost edge of the second open end portion toward the first open end portion for a predetermined length and the outermost edge of the second open end portions includes at least one stop formed in the internal threading at the outermost edge of the second open end portion;

an aperture in a wall of the second open end portion extends through the internal threading of the second open end portion and communicates with the central opening;

a plug having a length that is sufficient to extend from the outermost most edge of the second open end portion to a position beyond the aperture formed in the wall of the second open end portion and closes both the opening in the second open end portion and the aperture formed; and, the plug has a upper portion that includes a tool receiving recess directed toward the first open end and at least one appendage that extends away from the tool receiving recess and is dimensioned so the at least one appendage engages with the at least one stop formed in the internal threading at the outermost edge of the second open end portion.

2. The drain petcock of claim 1 wherein, further comprising a second stop and a second appendage.

3. The drain petcock of claim 2 wherein, the at least one appendage and the second appendage are within a plane defined by the outermost edge of the second open end portion.

4. The drain petcock of claim 1 wherein, the at least one appendage is within the outermost edge of the second open end portion when the at least one appendage is engaged with the at least one stop formed in the internal threading at the outermost edge of the second open end portion.

5. A drain petcock comprising:

a body that has a central opening extending between a first open end portion that is configured to engage with an opening in a fluid container and a second open end portion that is spaced from the first open end portion;

the second open end portion has an internal threading that extends from an outermost edge of the second open end portion toward the first open end portion for a predetermined length and the outermost edge of the second open end portions includes at least one stop formed in the internal threading at the outermost edge of the second open end portion;

an aperture in a wall of the second open end portion extends through the internal threading of the second open end portion and communicates with the central opening;

a plug having a length that is sufficient to extend from the outermost most edge of the second open end portion to a position beyond the aperture formed in the wall of the second open end portion and closes both the opening in the second open end portion and the aperture formed; and, the plug has a upper portion that is below the outermost edge of the second open end portion and the upper portion has at least one appendage that extends toward the outermost edge of the second open end portion and engages with the at least one stop formed in the internal threading at the outermost edge of the second open end portion.

* * * * *